US012346868B2

(12) United States Patent
Yang et al.

(10) Patent No.: US 12,346,868 B2
(45) Date of Patent: Jul. 1, 2025

(54) MAILING METHOD AND MAILING APPARATUS

(71) Applicant: BEIJING JINDONG ZHENSHI INFORMATION TECHNOLOGY CO., LTD., Beijing (CN)

(72) Inventors: Jianmin Yang, Beijing (CN); Xiaonan Yan, Beijing (CN); Wankui Ju, Beijing (CN); Zhenlong Qu, Beijing (CN); Chao Wang, Beijing (CN); Zhongliang Zhang, Beijing (CN); Ru Wang, Beijing (CN)

(73) Assignee: BEIJING JINDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/024,634

(22) PCT Filed: May 11, 2021

(86) PCT No.: PCT/CN2021/093002
§ 371 (c)(1),
(2) Date: Mar. 3, 2023

(87) PCT Pub. No.: WO2022/062420
PCT Pub. Date: Mar. 31, 2022

(65) Prior Publication Data

US 2023/0334410 A1 Oct. 19, 2023

(30) Foreign Application Priority Data

Sep. 28, 2020 (CN) ......................... 202011043404.0

(51) Int. Cl.
*G06Q 10/0832* (2023.01)
*G07B 17/00* (2006.01)

(52) U.S. Cl.
CPC ..... *G06Q 10/0832* (2013.01); *G06Q 2250/50* (2013.01); *G06Q 2250/60* (2013.01); *G06Q 2250/70* (2013.01); *G07B 2017/00701* (2013.01)

(58) Field of Classification Search
None
See application file for complete search history.

(56) References Cited

U.S. PATENT DOCUMENTS 7,183,506 B2 * 2/2007 Teraoka ............... G01G 19/415 361/728
8,407,110 B1 * 3/2013 Joseph ............... G06Q 30/0633 705/26.81

(Continued)

FOREIGN PATENT DOCUMENTS

AU 2011236079 A1 * 4/2013 ............. G06Q 10/10
CA 2325293 A1 * 5/2002 ............. G06F 21/16

(Continued)

OTHER PUBLICATIONS

Burnett, Lowell J., and Dale R. McKay. “Signal processing considerations in NMR detection of liquid explosives.” Applications of Signal and Image Processing in Explosives Detection Systems. vol. 1824. SPIE, 1993 (Year: 1993).*

(Continued)

*Primary Examiner* — George Chen
(74) *Attorney, Agent, or Firm* — Michael Best & Friedrich LLP

(57) ABSTRACT

The present invention relates to the technical field of computers. Disclosed are a mailing method and a mailing apparatus. An embodiment of the method comprises: in response to a mailing request from a user, sending an open instruction to an intelligent mailing cabinet, controlling an article placement region of the intelligent mailing cabinet to open, and acquiring article information of an article to be (Continued)

Start
S201 after the user logs in to the intelligent mailing box, controlling the opening of the article placement region according to the user's mailing request;
S202 detecting whether the article to be mailed contains liquid
No
Yes
S203 ejecting the liquid detecting device; after the user places the container containing liquid on the liquid detecting device, the liquid detecting device is used to perform safety detection on the liquid;
S204 determining whether the liquid is safe;
No
S208 using the display panel to display the information that the liquid is dangerous, and rejecting the mailing request;
Yes
S205 controlling the camera to take a picture of the article to be mailed to obtain the picture of the article to be mailed;
S206 invoking the image recognition interface, identifying the picture of the article to be mailed, and obtaining the category information and quantity information of the article to be mailed;
S207 using the weight sensor to weigh the article to be mailed, and obtaining the weight information of the article to be mailed;
End mailed already placed inside the article placement region; generating recommended service information according to the acquired article information, and sending the recommended service information to the intelligent mailing cabinet, such that the intelligent mailing cabinet displays the recommended service information; and in response to the user making an adjustment to the recommended service information, determining mailing service information corresponding to the article, and controlling the intelligent mailing cabinet to perform a mailing operation with respect to the article according to the mailing service information.

18 Claims, 6 Drawing Sheets

(56) References Cited

U.S. PATENT DOCUMENTS 9,779,378 B1 * 10/2017 Daniel ................ G06Q 10/083
10,026,194 B2 * 7/2018 Park ....................... G06Q 10/06
10,248,927 B2 * 4/2019 Tammattabattula ........................ G06Q 10/0836
11,842,419 B1 * 12/2023 Yoggi ............. G07B 17/00024
2001/0032443 A1 * 10/2001 Tiley ..................... G06Q 20/12 53/476
2002/0007281 A1 * 1/2002 Gil .................. G07B 17/00362 705/407
2002/0124664 A1 * 9/2002 Call .................... G01N 1/2273 73/863.22
2005/0108111 A1 * 5/2005 Kranyec ........... G06Q 30/0601 705/26.1
2007/0050316 A1 * 3/2007 Denson ........... G07B 17/00193 177/25.15
2007/0174213 A1 * 7/2007 Whitehouse .......... G06Q 30/02 705/401
2008/0035390 A1 * 2/2008 Wurz .................. G01G 19/035 702/156
2008/0040273 A1 * 2/2008 Savage ............. G06Q 20/1085 705/43
2008/0133372 A1 * 6/2008 Ramsden ............ G01G 19/005 705/17
2009/0192850 A1 7/2009 Pintsov et al.
2009/0222354 A1 * 9/2009 Murphy ............ G06V 30/1456 382/229
2010/0153291 A1 * 6/2010 Jimenez .......... G07B 17/00193 705/330
2011/0161231 A1 * 6/2011 Sievel ................. G06Q 20/204 705/17
2012/0066153 A1 * 3/2012 Whitehouse ........... G07F 17/42 705/407
2012/0123970 A1 * 5/2012 Lorello ........... G07B 17/00661 705/410
2014/0067665 A1 * 3/2014 Paletz ............. G06Q 10/08345 705/40
2014/0104414 A1 * 4/2014 McCloskey ........ G01B 11/2513 348/135
2014/0279648 A1 * 9/2014 Whitehouse ......... G06Q 10/083 705/330
2015/0199569 A1 * 7/2015 Park ......................... B07C 5/16 382/101
2015/0348282 A1 * 12/2015 Gibbon ............... G06V 20/647 382/103
2016/0239789 A1 * 8/2016 Hanks ................. G06Q 10/083
2018/0005336 A1 1/2018 Nolan et al.
2018/0121865 A1 5/2018 Rubinstein

FOREIGN PATENT DOCUMENTS

CN 101278169 A * 10/2008 ............ A41D 31/28
CN 103279849 A 9/2013
CN 104463542 A 3/2015
CN 104899981 A 9/2015
CN 107516260 A 12/2017
CN 206876129 U 1/2018
CN 107909742 A 4/2018
CN 108776881 A 11/2018
CN 109299892 A 2/2019
CN 109753977 A 5/2019
CN 109801011 A 5/2019
CN 110334998 A 10/2019
CN 110458497 A 11/2019
CN 110648470 A 1/2020
CN 210377681 U 4/2020
CN 111680941 A 9/2020
JP 2004-083149 A 3/2004
JP 2015518591 A 7/2015
JP 2019-519867 A 7/2019
JP 2019122620 A 7/2019
JP 2020-111933 A 7/2020
KR 20020021205 A * 9/2000
WO WO-9217861 A1 * 10/1992 ....... G07B 17/00193
WO WO-0247831 A2 * 6/2002 .............. B07C 3/14
WO WO-2005076236 A2 * 8/2005 ....... G07B 17/00193

OTHER PUBLICATIONS

Singh, Sameer, and Maneesha Singh. "Explosives detection systems (EDS) for aviation security." Signal processing 83.1 (2003): 31-55 (Year: 2003).*

Chinese Patent Office Action for Related Application No. 202011043404.0 dated Mar. 23, 2022 (20 pages, including a partial English translation).

International Search Report and Written Opinion for Related Application No. PCT/CN2021/093002 (10 pages, including a partial English translation).

European Patent Office Extended Search Report for Application No. 21870807.1 dated Jul. 22, 2024 (9 pages).

Japanese Patent Office Action for Patent Application No. 2023512018 dated Sep. 30, 2024 (5 pages including English machine translation).

Akita Town Joho Web Magazine, "I sent the product using Imadoki's courier receiving and shipping locker PUDO Station"! (machine translation of title), Oct. 25, 2019, https://web.akita-townjoho.jp/news/20191025-pudo-okuri/.

Japanese Patent Office Notice of Reasons for Refusal for Application No. 2023-512018, dated Dec. 15, 2023 (16 pages, including translation).

* cited by examiner

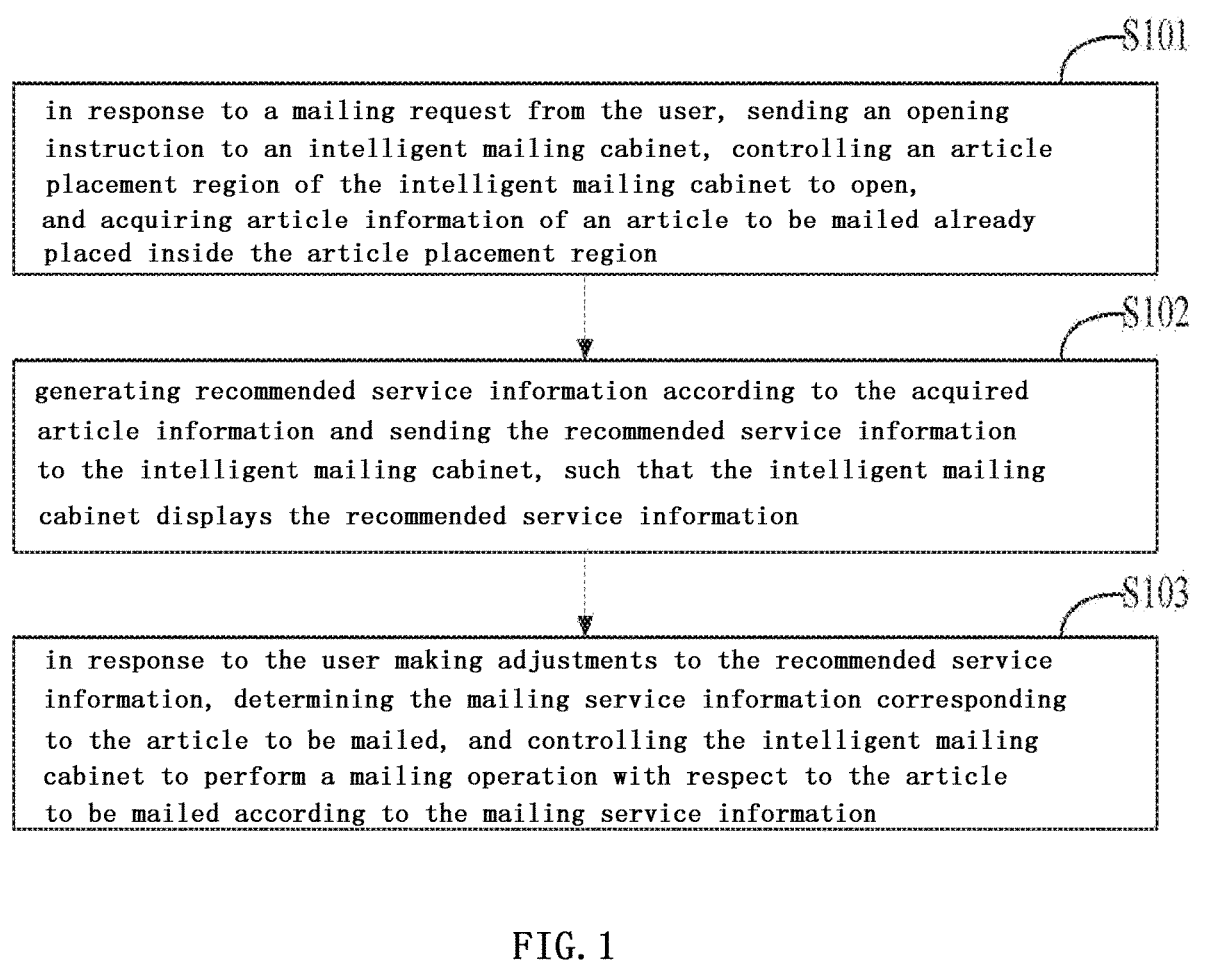

S101: in response to a mailing request from the user, sending an opening instruction to an intelligent mailing cabinet, controlling an article placement region of the intelligent mailing cabinet to open, and acquiring article information of an article to be mailed already placed inside the article placement region S102: generating recommended service information according to the acquired article information and sending the recommended service information to the intelligent mailing cabinet, such that the intelligent mailing cabinet displays the recommended service information S103: in response to the user making adjustments to the recommended service information, determining the mailing service information corresponding to the article to be mailed, and controlling the intelligent mailing cabinet to perform a mailing operation with respect to the article to be mailed according to the mailing service information

FIG. 1

MAILING METHOD AND MAILING APPARATUS

CROSS-REFERENCE TO RELATED APPLICATION(S)

This is a U.S. national stage entry of International Patent Application No. PCT/CN2021/093002, filed on May 11, 2021, which claims priority to Chinese Patent Application No. 202011043404.0, filed on Sep. 28, 2020, the entire contents of each of which are fully incorporated herein by reference.

The present application claims the priority of the Chinese Application No. 202011043404.0 entitled "Mailing Method and Mailing Apparatus" and filed on Sep. 28, 2020, the entire contents of which are incorporated herein by reference.

TECHNICAL FIELD

The present disclosure relates to the field of computer technology, and in particular, to a mailing method and a mailing apparatus.

BACKGROUND TECHNOLOGY

The intelligent express cabinet has functions such as identity verification, weighing, packaging, and printing sheets. The mailing process of the existing intelligent express cabinet is that users fill in the information through the WeChat applet or the official website to place an order, and then go to the mailing cabinet to complete the mailing operation of the express. Although the existing intelligent mailing cabinet saves the courier's pick-up process, it has the following disadvantages: 1. The ordering process is separated from the mailing cabinet operation, which will cause the problem of information mismatch between online operation and actual mailing and may cause user complaints and will also bring about problems of abnormal mailing; 2. For special articles, such as fragile articles, the existing intelligent mailing cabinets have limitations, limiting actual application scenarios.

SUMMARY OF THE INVENTION

In view of this, embodiments of the present disclosure provide a mailing method and a mailing apparatus, which can solve the problem of information mismatch between online operation and actual mailing in the prior art, and can achieve the effect of using mailing services corresponding to different articles to be mailed for mailing operations. It can satisfy more actual application scenarios and bring better user experiences.

In order to achieve the above object, a mailing method is provided according to the first aspect of embodiments of the present disclosure.

The mailing method in the embodiments of the present disclosure comprises: in response to a mailing request from a user, sending an open instruction to an intelligent mailing cabinet, controlling an article placement region of the intelligent mailing cabinet to open, and acquiring article information of an article to be mailed already placed inside the article placement region; generating recommended service information according to the acquired article information and sending the recommended service information to the intelligent mailing cabinet, such that the intelligent mailing cabinet displays the recommended service information; in response to the user making an adjustment to the recommended service information, determining the mailing service information corresponding to the article to be mailed, and controlling the intelligent mailing cabinet to perform a mailing operation with respect to the article to be mailed according to the mailing service information.

Optionally, the acquiring of article information of the article to be mailed already placed inside the article placement region includes: after the article to be mailed is placed inside the article placement region, controlling a camera of the intelligent mailing cabinet to take a picture of the article to be mailed to obtain the picture of the article to be mailed; invoking an image recognition interface of the intelligent mailing cabinet to identify the image of the article to be mailed to obtain the category information and quantity information of the article to be mailed; weighing the article to be mailed using a weight sensor of the intelligent mailing cabinet and obtaining weight information of the article to be mailed.

Optionally, before controlling the camera of the intelligent mailing cabinet to take a picture of the article to be mailed, the method further comprises: in the case that the article to be mailed contains liquid, controlling the intelligent mailing cabinet to eject a liquid detecting device, performing safety detection on the liquid using the liquid detecting device; in the case of detecting that the liquid is safe, controlling the camera to take a picture of the article to be mailed; in the case of detecting that the liquid is dangerous, sending the information that the liquid is dangerous to the intelligent mailing cabinet and rejecting the mailing request.

Optionally, after acquiring the article information of the article to be mailed already placed inside the article placement region, the method further includes: sending the article information to the intelligent mailing cabinet and controlling the intelligent mailing cabinet to display the article information, so that the user can confirm the article information.

Optionally, generating the recommended service information according to the acquired article information includes: judging whether the article to be mailed meets the condition for mailing according to the article information; if yes, taking the article information as a matching condition, matching the first recommended service information corresponding to the article to be mailed from the article knowledge base, and predicting the second recommended service information corresponding to the article information based on the user behavior analysis model; if no, returning the information that does not meet the condition for mailing to the intelligent mailing cabinet, so that the intelligent mailing cabinet can display the information that does not meet the condition for mailing and reject the mailing request; wherein, the recommended service information consists of the first recommended service information and the second recommended service information.

Optionally, the article knowledge base is generated by mapping articles based on the set mailing rules, and the article knowledge base stores a mapping relationship between articles and mailing conditions corresponding to the articles.

Optionally, in response to the user making an adjustment to the recommended service information, determining the mailing service information corresponding to the article to be mailed, includes: determining, after the user making the adjustment to the displayed recommended service information according to specific requirements, that the displayed service information is the mailing service information.

Optionally, the controlling of the intelligent mailing cabinet to perform a mailing operation with respect to the article to be mailed according to the mailing service information, includes: receiving an order with respect to the article to be mailed according to the mailing service information, and sending the order receiving processing result to the intelligent mailing cabinet, so as to control the intelligent mailing cabinet to perform a mailing operation on the article to be mailed according to the order receiving processing result.

Optionally, the order receiving processing result includes: packaging guide operation and mailing sheet information; and the controlling of the intelligent mailing cabinet to perform the mailing operation on the article to be mailed according to the order receiving processing result, includes: controlling a printing device of the intelligent mailing cabinet to generate a sheet of the article to be mailed according to the mailing sheet information; according to the packaging guide operation, controlling the packaging device of the intelligent mailing cabinet to package the articles to be mailed, and then affixing the sheet to the packaged article to be mailed.

Optionally, the order receiving processing result includes: label information; and the method further includes: controlling the printing device to generate a label of the article to be mailed according to the label information, and affixing the label to the packaged article to be mailed.

Optionally, the operation processing result includes: fee information; and, the method further includes: controlling the intelligent mailing cabinet to display the fee information so as to guide the user to pay the fee.

Optionally, the mailing request includes: a mailing address and a receiving address; and the processing of order receiving with respect to the articles to be mailed according to the mailing service information, includes: verifying the reasonableness of the mailing service information according to the mailing address and receiving address; if the verification passes, generating the order receiving processing result and returning the order receiving processing result; if the verification fails, the information that the reasonableness verification fails is returned, so that the intelligent mailing cabinet can display the information that the reasonableness verification fails and reject the mailing request.

To achieve the above object, according to a second aspect of the embodiments of the present disclosure, a mailing apparatus is provided.

A mailing apparatus according to embodiments of the present disclosure comprises: an acquiring module configured to send an opening instruction to an intelligent mailing cabinet in response to a user's mailing request, control the article placement region of the intelligent mailing cabinet to open, and acquire article information of the article to be mailed already placed inside the article placement region; a generating module configured to generate recommended service information according to the acquired article information, and send the recommended service information to the intelligent mailing cabinet, so that the intelligent mailing cabinet displays the recommended service information; a mailing module configured to determine the mailing service information corresponding to the article to be mailed in response to the user making adjustments to the recommended service information and control the intelligent mailing cabinet to perform the mailing operation on the article to be mailed according to the mailing service information.

Optionally, the acquiring module is further configured to: after placing the article to be mailed in the article placement region, control a camera of the intelligent mailing cabinet to take a picture of the article to be mailed, and obtain the picture of the article to be mailed; invoke the image recognition interface of the intelligent mailing cabinet to identify the picture of the article to be mailed and acquire the category information and quantity information of the article to be mailed; weigh the article to be mailed using a weight sensor of the intelligent mailing cabinet to acquire the weight information of the article to be mailed.

Optionally, the acquiring module is further configured to: in the case that the article to be mailed contains liquid, control the intelligent mailing cabinet to eject a liquid detecting device, and use the liquid detecting device to perform safety detection on the liquid; in the case that the liquid is detected to be safe, control the camera to take a picture of the article to be mailed; in the case that the liquid is detected to be dangerous, send a message to the intelligent mailing cabinet that the liquid is dangerous, and reject the mailing request.

Optionally, the acquiring module is further configured to: send the article information to the intelligent mailing cabinet and control the intelligent mailing cabinet to display the article information, so that the user can confirm the article information.

Optionally, the generating module is further configured to: determine whether the article to be mailed meets the condition for mailing according to the article information; if yes, taking the article information as a matching condition, match the first recommended service information corresponding to the article to be mailed from the article knowledge base, and predict the second recommended service information corresponding to the article information based on the user behavior analysis model; if no, return the information that does not meet the condition for mailing to the intelligent mailing cabinet, so that the intelligent mailing cabinet can display the information that does not meet the condition for mailing and reject the mailing request; wherein, the recommended service information consists of the first recommended service information and the second recommended service information.

Optionally, the mailing module is further configured to: after the user making adjustments to the displayed recommended service information according to specific requirements, determine that the displayed service information is the mailing service information.

Optionally, the mailing module is further configured to: perform order receiving processing on the article to be mailed according to the mailing service information, and send the order receiving processing result to the intelligent mailing cabinet, so as to control the intelligent mailing cabinet to perform the mailing operation on the article to be mailed according to the order receiving processing result.

Optionally, the order receiving processing result includes: packaging guide operation and mailing sheet information; and the mailing module is further configured to: control the printing device of the intelligent mailing cabinet to generate a sheet of the article to be mailed according to the mailing sheet information; according to the packaging guide operation, control the packaging device of the intelligent mailing cabinet to package the article to be mailed, and then affix the sheet to the packaged article to be mailed.

Optionally, the order receiving processing result includes: label information; and the mailing module is further configured to: control the printing device to generate a label of the article to be mailed according to the label information, and affix the label to the packaged article to be mailed.

Optionally, the operation processing result includes: fee information; and the mailing module is further configured to: control the intelligent mailing cabinet to display the fee information, so as to guide the user to pay the fee.

Optionally, the mailing request includes: a mailing address and a receiving address; and the mailing module is further configured to: verify the reasonableness of the mailing service information according to the mailing address and the receiving address; if the verification passes, generate the order receiving processing result and return the order receiving processing result; if the verification fails, return the information that the reasonableness verification fails, so that the intelligent mailing cabinet can display the information that the reasonableness verification fails and reject the mailing request.

To achieve the above object, according to a third aspect of the embodiments of the present disclosure, an electronic device is provided.

An electronic device according to embodiments of the present disclosure comprises: one or more processors; a storage device configured to store one or more programs, when the one or more programs are executed by the one or more processors, the one or more processors are enabled to implement the mailing method of embodiments of the present disclosure.

To achieve the above object, according to a fourth aspect of the embodiments of the present disclosure, a computer-readable medium is provided.

A computer-readable medium of the embodiments of the present disclosure with a computer program stored thereon, and when the program is executed by the processor, the mailing method of the embodiments of the present disclosure is implemented.

One of the embodiments in the above disclosure has the following advantages or advantageous effects: after placing the article in the article placement region of the intelligent mailing cabinet, the user can control the intelligent mailing cabinet to obtain the article information of the article to be mailed without a need of placing an order through the WeChat applet or filling in the information on the official website, which solves the problem of information mismatch between online operations and actual mailing in the prior art. In addition, the recommended service information generated according to the article information can be sent to the intelligent mailing cabinet, and then the recommended service information can be adjusted in response to the user's needs to obtain the mailing service information, which achieves the effect of performing mailing operations by using the mailing services corresponding to different articles to be mailed, satisfies more actual application scenarios and brings better use experience to the users.

The further effects of the above non-conventional alternatives will be described below in conjunction with specific embodiments.

BRIEF DESCRIPTION OF DRAWINGS

The drawings are useful for a better understanding of the present disclosure, and do not constitute an improper limitation of the present disclosure, wherein:

FIG. 1 is a schematic diagram of main steps of a mailing method according to an embodiment of the present disclosure;

DESCRIPTION OF EMBODIMENTS

Figure 2:
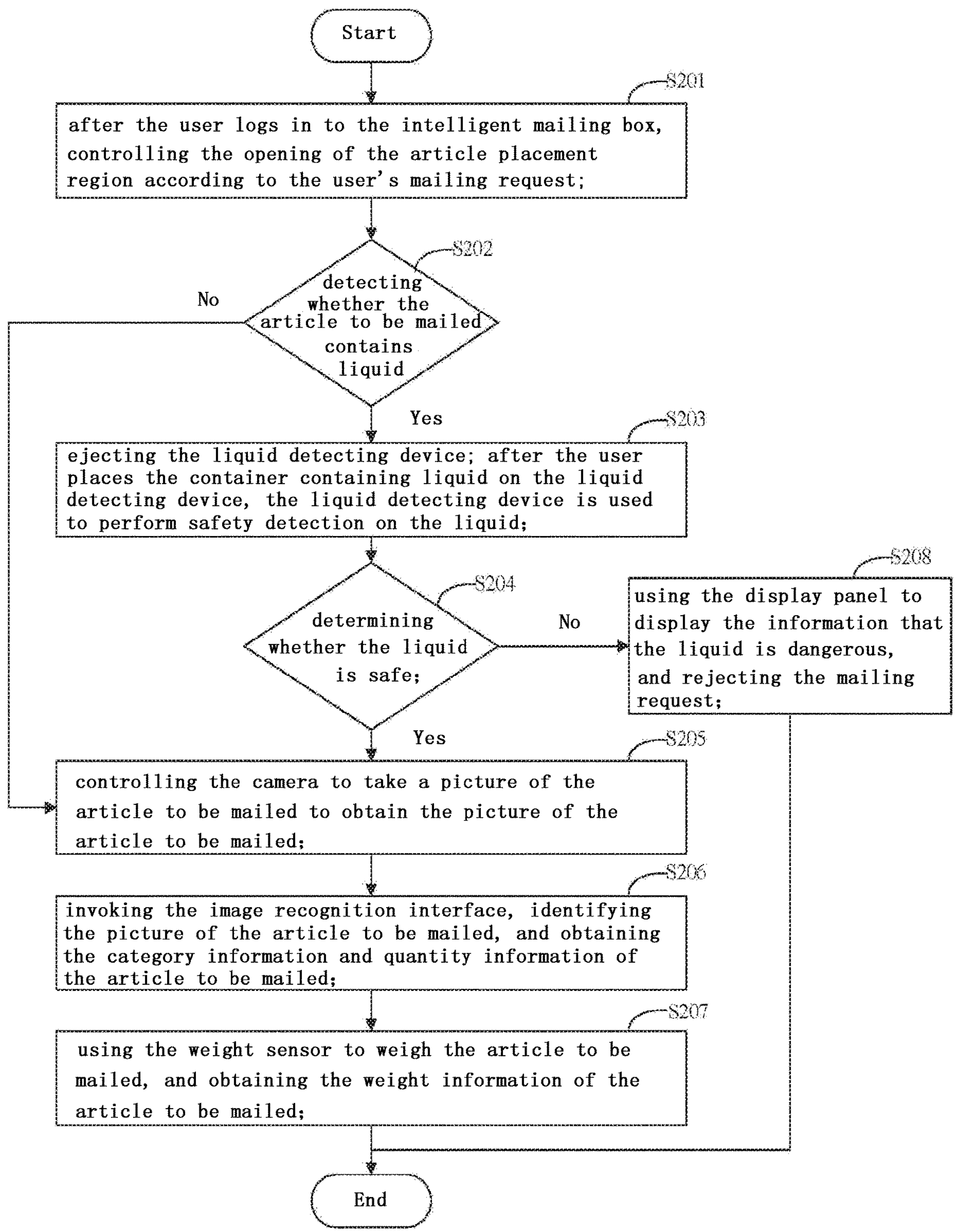
FIG. 2 is a schematic diagram of a main flow of a method for acquiring article information according to an embodiment of the present disclosure.

Exemplary embodiments of the present disclosure are described below with reference to the drawings, which includes various details of the embodiments of the present disclosure to facilitate understanding and should be considered as exemplary only. Accordingly, those skilled in the art will recognize that various changes and modifications can be made to the embodiments described herein without departing from the scope and spirit of the present disclosure. Likewise, descriptions of well-known functions and structures are omitted from the following description for clarity and conciseness.

In order to solve the problems existing in the intelligent mailing cabinet, the embodiments of the present disclosure provide a mailing method based on an intelligent mailing cabinet system. FIG. 1 is a schematic diagram of main steps of a mailing method according to an embodiment of the present disclosure. As shown in FIG. 1, the main steps of the mailing method may include:

Step S101, in response to a mailing request from the user, sending an opening instruction to an intelligent mailing cabinet, controlling an article placement region of the intelligent mailing cabinet to open, and acquiring article information of an article to be mailed already placed inside the article placement region;

Step S102, generating recommended service information according to the acquired article information and sending the recommended service information to the intelligent mailing cabinet, such that the intelligent mailing cabinet displays the recommended service information;

Step S103, in response to the user making adjustments to the recommended service information, determining the mailing service information corresponding to the article to be mailed, and controlling the intelligent mailing cabinet to perform a mailing operation with respect to the article to be mailed according to the mailing service information.

When the user uses the intelligent mailing cabinet for mailing, he/she should first complete the user login on the intelligent mailing cabinet by means of mobile phone number input, face recognition, fingerprint recognition, etc., so as to identify the user and ensure that the user's identity is legal and effective. Since the user has successfully logged in, the delivery fee can be deducted directly from the user account logged in. After the user logging in, the user's mailing request can be inputted, which includes: sender information, mailing address, recipient information and receiving address. Certainly, the mailing request can also include: the user's custom requirements, for example, the user specifies the payment as paid by sender or paid by recipient.

It should be noted that if the intelligent mailing cabinet is already fully loaded, for example, the intelligent mailing cabinet has forty express cabinets in which the articles can be placed. If the articles have already been placed in these forty cabinets, it means that the intelligent mailing cabinet cannot deal with new mailing requests. After the intelligent mailing cabinet receives the mailing request sent by the user, it can inform the user through the display panel or voice that "the intelligent mailing cabinet is already fully loaded and no mailing service is available right now. We are sorry for the inconvenience." Certainly, there are other situations that cause the intelligent mailing cabinet to fail to work normally. The basic condition of the mailing method discussed in the embodiments of the present disclosure is that the intelligent mailing cabinet can work normally, that is, the intelligent mailing cabinet is not in a fully loaded state, and the packaging tools provided by the intelligent mailing cabinet are enough, etc. The packaging tools can include but are not limited to: packaging boxes of different sizes and different categories, packaging bags of different sizes and different categories, packaging tapes, packaging fillers, ice packs, moisture-proof agents, sheet paper for printing the sheet, and label paper for printing labels.

After the user clicks on Mailing on the display panel of the intelligent mailing cabinet or confirms the Mailing through the keyboard, the intelligent mailing cabinet can receive the user's mailing request and send the user's mailing request to the server. Then, the server can send an opening instruction to the intelligent mailing cabinet, and then control the article placement region of the intelligent mailing cabinet to automatically open, and the article placement region can be regarded as a mailing window of the intelligent mailing cabinet. Considering that the intelligent mailing cabinet can also have a pickup function, for example, in order to achieve contactless delivery or when the user is inconvenient to receive the package, the courier can place the article in the cabinet, so that the user can perform the pickup operation using a pickup code. In order to distinguish it from the pickup function, the intelligent mailing cabinet will only receive the opening instruction sent by the server after receiving the mailing request, and then control the article placement region to automatically open, and then prompt the user to place the articles to be mailed in the article placement region.

After the user places the article to be mailed in the article placement region, the article information of the article to be mailed can be obtained, and the article information may include: category information, quantity information and weight information. In the embodiments of the present disclosure, after acquiring the article information of the articles to be mailed already placed inside the article placement region, the intelligent mailing cabinet displays the acquired article information on the display panel, and after the user confirms the article information, the article information is send to the server, so that the server can generate the recommended service information according to the article information. In order to avoid user complaints caused by article information, after acquiring the article information, the intelligent mailing cabinet can inform the user of the information of the articles to be mailed through the display panel, for example, "the articles to be mailed are two mobile phones and the total weight is 1.5 kg" is displayed on the display panel. After the user confirms the article information, the server can generate the recommended service information corresponding to the article to be mailed according to the article information.

Thereinto, the recommended service information is a service recommended to the user for mailing the article to be mailed, including: a recommended product to be mailed, a recommended packaging method, a recommended value-added service, and the like. The products to be mailed can include timely products that highlight the delivery time, for example, special delivery, express delivery, on-time delivery, and next-day delivery, and can include small, express, extra-large and other products that highlight the size of the articles, and can also include special products such as fresh delivery. Packaging methods can include: packaging boxes to be used, such as small ordinary express boxes, large environment-friendly express boxes (i.e., recyclable express boxes), and small foam express boxes (i.e., express boxes useful for low-temperature refrigerated transport); packaging bags to be used, such as small environment-friendly express bags (i.e., recyclable express bags), medium-sized ordinary express bags, and large express bubble bags (i.e., a transparent flexible packaging bag of which the middle layer of the air cushion film is filled with air, having good shock absorption); whether packaging fillers for protecting the article are required; whether ice packs for fresh-keeping are required; whether a moisture-proof agent for dehumidification is required; whether a label for reminding delivery is required, such as fragile labels. Value-added services can include: insured price, collection of payment for goods, return of signed orders and other services.

After the intelligent mailing cabinet displays the recommended service information on the display panel, users can adjust the recommended service information on the display panel according to their own needs, and finally the service information displayed on the display panel is the mailing service information corresponding to the articles to be mailed. Therefore, as the reference embodiment of the present disclosure, in response to the user making adjustments to the recommended service information, determining the mailing service information corresponding to the article to be mailed may include: determining that the service information displayed on the display panel is the mailing service information after the user adjusts the recommended service information displayed on the display panel according to specific requirements. For example, the timely product selected in the recommended service information is a special offer, but the user expects next-day delivery, so the user changes the timely product to next-day delivery on the display panel. Also, there is no payment collection in the recommended service information, but the user has the demand for payment collection, so the user can add the value-added service payment collection on the display panel.

After obtaining the mailing service information, the intelligent mailing cabinet can be controlled to perform the mailing operation on the article to be mailed according to the mailing service information. In the embodiments of the present disclosure, the specific implementation is as follows: the intelligent mailing cabinet sends the mailing service information displayed on the display panel to the server, so that the server can receive the order with respect to the article to be mailed according to the mailing service information, and then return the order receiving processing result to the intelligent mailing cabinet; then, the intelligent mailing cabinet can be controlled to perform the mailing operation on the article to be mailed according to the order receiving processing result. Since the user mailing is only a part of the logistics industry, it is necessary to assign the mailing sheet corresponding to the article to be mailed to a specific courier or distribution point, and to conduct logistics inquiries according to the specific mailing service information, and to conduct big data analysis according to the specific mailing service information in the future. Therefore, in the embodiment of the present disclosure, the intelligent mailing cabinet needs to send the mailing service information to the server, so that the server can receive the order according to the mailing service information. After finishing the order receiving, the intelligent mailing cabinet can carry out mailing operations such as packaging, affixing the sheet and charging.

In the mailing method of the embodiments of the present disclosure, after the user places the article in the article placement region of the intelligent mailing cabinet, he/she can control the intelligent mailing cabinet to acquire the information of the article to be mailed without a need of placing the order by filling in the information through the WeChat applet or the official website. It solves the problem of information mismatch between online operation and actual mailing in the prior art. In addition, the recommended service information generated according to the article information can be sent to the intelligent mailing cabinet, and then the recommended service information can be adjusted in response to the user's demands to obtain the mailing service information, which thereby achieves the effect of using mailing services corresponding to different articles to be mailed to perform mailing operations, satisfies more actual application scenarios and brings better user experience.

The mailing method of the embodiment of the present disclosure mainly includes three parts: acquiring article information of the article to be mailed, generating the recommended service information, and performing the mailing operation. In order to improve accuracy of the recommended service information and further improve the user experience, it is necessary to ensure the accuracy of the acquired article information, and next, the process of acquiring the article information should be described in detail.

In the reference embodiments of the present disclosure, acquiring the article information of the article to be mailed already placed in the article placement region may include: after placing the article to be mailed in the article placement region, controlling the camera of the intelligent mailing cabinet to take a picture of the article to be mailed, obtaining the picture of the article to be mailed; invoking the image recognition interface of the intelligent mailing cabinet to identify the picture of the article to be mailed, and obtaining the category information and quantity information of the article to be mailed; using a weight sensor of the intelligent mailing cabinet to weigh the article to be mailed to acquire the weight information of the article to be mailed.

After the user places the article to be mailed in the article placement region, the intelligent mailing cabinet can sense the article to be mailed, and then send the information that the articles to be mailed have been placed in the article placement region to the server, so that the server can control the camera to take pictures of the articles to be mailed. For example, there is a weight sensor in the article placement region that can sense the article to be mailed. When the weight sensor senses a weight change, the intelligent mailing cabinet will sense the article to be mailed. The camera can be installed on the top of the article placement region and can be rotated, so that the articles to be mailed can be photographed from different angles, further improving the accuracy of the article information. After obtaining the picture of the article to be mailed, the intelligent mailing cabinet can invoke the image recognition interface, and then identify the picture of the article to be mailed to identify the category information and quantity information of the article to be mailed. Specifically, feature points can be extracted from the picture of the article to be mailed to obtain a feature set to be identified, then feature matching is performed between the feature set to be identified and the pre-trained image matching set, and finally the category information and quantity information of the article to be mailed can be determined according to the feature matching result. Since identifying the category information and quantity information of the article in the picture based on the image recognition technology belongs to the existing mature technology, it will not be described in detail here. In addition, the weight sensor can also weigh the articles to be mailed and obtain the weight information of the articles to be mailed.

Considering that the analyzing of the picture of the article to be mailed is to match according to the outline of the article to obtain its corresponding category information, and the liquid cannot be analyzed. Therefore, in the reference embodiment of the present disclosure, before controlling the camera of the intelligent mailing cabinet to take a picture of the article to be mailed, the mailing method may further include: if the article to be mailed contains liquid, controlling the intelligent mailing cabinet to eject the liquid detecting device, using the liquid detecting device to detect the safety of the liquid; if the liquid is detected to be safe, controlling the camera to take pictures of the articles to be mailed; if the liquid is detected to be dangerous, sending information that the liquid is dangerous to the intelligent mailing cabinet and rejecting the mailing request. In the mailing method of the embodiments of the present disclosure, after detecting that the article to be mailed contains liquid, the intelligent mailing cabinet can be controlled to automatically eject the liquid detecting device, so that the user can place the container containing liquid in the liquid detecting device, and then the liquid detecting device detects whether the liquid is safe. If the liquid is detected to be safe, the camera can be controlled to take pictures. If the liquid is detected to be dangerous, the display panel of the intelligent mailing cabinet can directly display "The article to be mailed contains dangerous liquid and cannot be mailed." After receiving this message, the user can remove the dangerous liquid and then click to continue to mail; or, can click exit to terminate the mailing request.

FIG. 2 is a schematic diagram of a main flow of a method for acquiring article information according to an embodiment of the present disclosure; as shown in FIG. 2, the main flow of the method for acquiring article information may include:

Step S201, after the user logs in to the intelligent mailing box, controlling the opening of the article placement region according to the user's mailing request;

Step S202, after the user places the article to be mailed in the article placement region, detecting whether the article to be mailed contains liquid, if yes, go to step S203, if no, go to step S205;

Step S203, the liquid detecting device is ejected, and after the user places the container containing liquid on the liquid detecting device, the liquid detecting device is used to perform safety detection on the liquid;

Step S204, determining whether the liquid is safe; if yes, go to step S205; otherwise, go to step S208;

Step S205, controlling the camera to take a picture of the article to be mailed to obtain the picture of the article to be mailed;

Step S206, invoking the image recognition interface, identifying the picture of the article to be mailed, and obtaining the category information and quantity information of the article to be mailed;

Step S207, using the weight sensor to weigh the article to be mailed, and obtaining the weight information of the article to be mailed;

Step S208, using the display panel to display the information that the liquid is dangerous, and rejecting the mailing request.

It should be noted that in step S203, after the user places the container containing liquid on the liquid detecting device, the liquid detecting device can perform safety detection on the liquid, and a preset time can be set. If the user fails to place the container containing liquid on the liquid detecting device within the preset time, the intelligent mailing cabinet can remind the user to operate. In addition, step S207 is used to obtain the weight information of the article to be mailed, and the specific order of execution can be adjusted according to the actual situation and can be executed between after the user places the article to be mailed in the article placement region and the intelligent mailing cabinet sends the article information to the server.

In the process of obtaining the article information of the article to be mailed, the liquid can be detected first. When the liquid is determined to be safe, the article to be mailed can be photographed, and then the image recognition interface is invoked to identify the category information and quantity information of the article to be mailed. Therefore, the intelligent mailing cabinet can be used for mailing liquids and providing more application scenarios.

Figure 3:
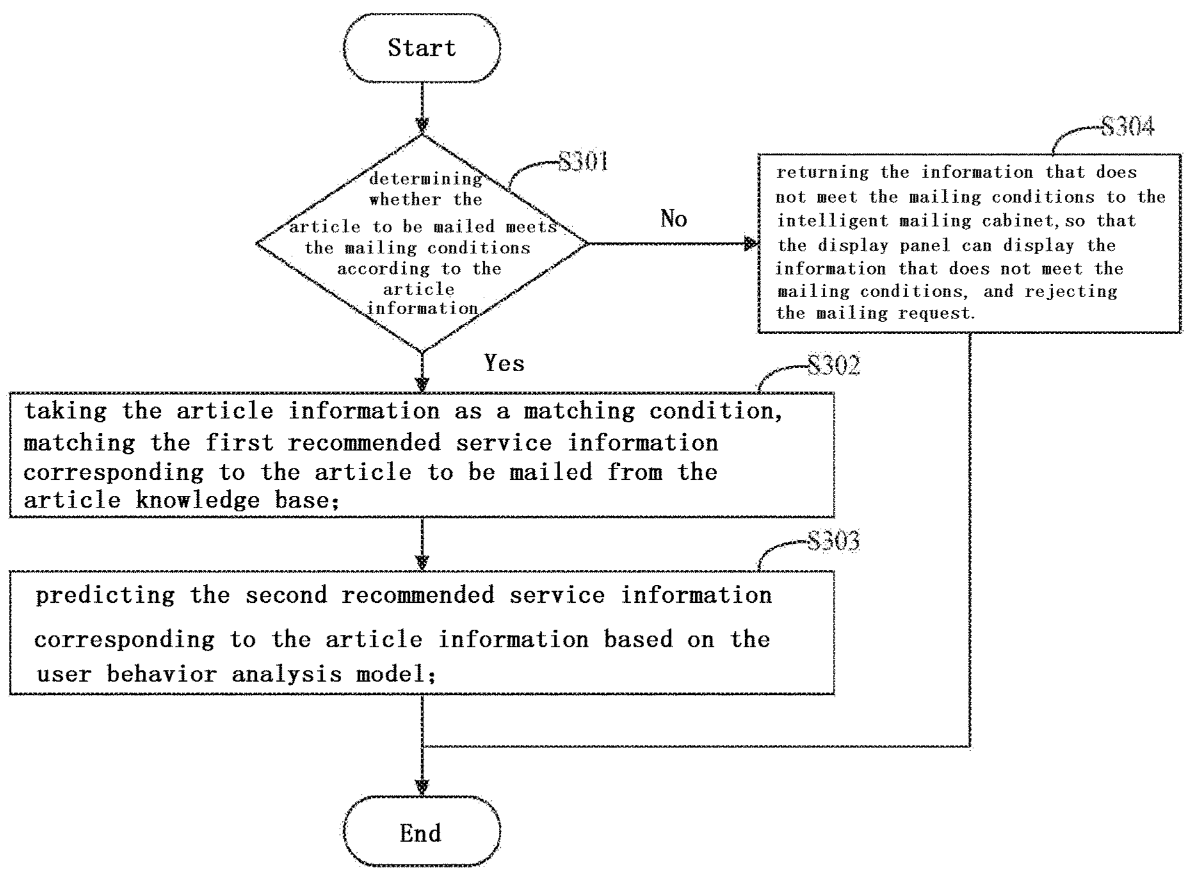
FIG. 3 is a schematic diagram of a main flow of a method for generating recommended service information according to an embodiment of the present disclosure.

After obtaining the article information of the article to be mailed, the server generates recommended service information corresponding to the article to be mailed according to the article information, and returns the generated recommended service information to the intelligent mailing cabinet. In the reference embodiment of the present disclosure, the server may generate the recommended service information according to the method shown in FIG. 3 (i.e. a schematic diagram of a main flow of a method for generating recommended service information according to an embodiment of the present disclosure). As shown in FIG. 3, the main process of the method for generating recommended service information may include:

Step S301, based on the article knowledge base, determining whether the article to be mailed meets the mailing conditions according to the article information, if yes, go to step S302, if no, go to step S304;

Step S302, taking the article information as a matching condition, matching the first recommended service information corresponding to the article to be mailed from the article knowledge base;

Step S303, predicting the second recommended service information corresponding to the article information based on the user behavior analysis model;

Step S304, returning the information that does not meet the mailing conditions to the intelligent mailing cabinet, so that the display panel can display the information that does not meet the mailing conditions, and rejecting the mailing request.

It should be noted that step S302 is used to acquire the first recommended service information, and step S303 is used to acquire the second recommended service information. The first recommended service information and the second recommended service information together constitute the recommended service information, and the execution order of S302 and S303 can be adjusted. Next, the generation process of the recommended service information will be described in detail. The article knowledge base is generated by mapping articles based on the set mailing rules, and the mapping relationship between articles and mailing conditions corresponding to the articles is stored in the article knowledge base. The set mailing rules can include mailing rules of the logistics industry. For example, forbidden articles can be defined, such as guns and ammunition, controlled equipments, explosives, flammable liquids, and flammable solids, which are prohibited from mailing. And the quantity of articles to be mailed can be limited, for example, the maximum mailing quantity of cigarettes is limited to 2, and the maximum mailing volume of tobacco leaves is limited to 5 kg, etc. The articles that can only be transported by land may be limited, for example, cameras with lithium batteries can only be mailed by land. Definitely, the mailing rules also include other mailing rules, which are not described in detail in the embodiments of the present disclosure. For details, reference may be made to the mailing standards set by post offices and other express companies. In addition, you can also set the packaging requirements corresponding to the articles in the mailing rules. For example, set the use of foam express boxes and ice packs for packaging fresh items, and set the use of packaging fillers and fragile labels for packaging fragile items such as mobile phones. Moreover, value-added services can also be set in the mailing rules, for example, insurance policy is provided for high-value items such as jade.

In the embodiments of the present disclosure, the article knowledge base is generated by mapping articles based on the set mailing rules, and the mapping relationship between the article and the mailing conditions corresponding to the article is stored in the item knowledge base. For example, the mailing conditions corresponding to mobile phone items are: recommended insured price and needs for packaging fillers and fragile labels. Therefore, after acquiring the article information, the article information can be used as a matching condition to match the first recommended service information corresponding to the article to be mailed from the article knowledge base, wherein the first recommended service information is the recommended service information obtained by using the article knowledge base. It should be noted that the mailing rules can be dynamically adjusted according to actual needs, and then the article knowledge base can be updated with the adjusted mailing rules, so that the article knowledge base can comply with the practical request, further obtaining more accurate first recommended service information and improving user experience.

In addition to obtaining the first recommended service information by using the article knowledge base, the second recommended service information corresponding to the article information can also be predicted based on the user behavior analysis model. Among them, the user behavior analysis model is a model obtained by analyzing the user's historical mailing behavior. This user behavior analysis model can recommend preferred mailing products and value-added services to users. As mentioned above, mailing products can include special delivery, express delivery, on-time delivery, next-day delivery and other timely products that highlight the delivery time, and can include small, express, extra-large and other products that highlight the size of the article, and can also include special products such as fresh delivery. Value-added services can include: insured price, collection of payment for goods, return of signed orders and other services. Since the products related to the size of the articles, such as small delivery, express, and extra-large delivery need to conform to the size and volume of the articles to be mailed, it doesn't make sense to predict them. In addition, other special products, collection of payment, and return of signed orders are all set according to the specific requirements for the articles to be mailed, and it doesn't make sense to predict them either. Therefore, the user behavior analysis model here is mainly used to analyze the timely products and value-added services that users prefer. For example, if the article information is analyzed through the user analysis model, it is predicted that more than 80% of the users will choose on-time delivery, and the second recommended service information includes on-time delivery products.

After the server generates the recommended service information, it can send the recommended service information to the intelligent mailing cabinet, and then the intelligent mailing cabinet can display the recommended service information on the display panel after obtaining the user's confirmation, and then the user can modify the recommended service information to obtain the mailing service information. If the user does not agree to display the recommended service information, under the condition that the server verifies that the article to be mailed meets the mailing conditions, the user can enter the desired mailing service on the display panel to obtain the mailing service information corresponding to the article to be mailed. Finally, the intelligent mailing cabinet can send the mailing service information to the server. After the server conducted order receiving processing to the articles to be mailed according to the mailing service information, the intelligent mailing cabinet receives the order receiving processing result returned by the server and then performs the mailing operation on the articles to be mailed according to the order receiving processing result.

In the reference embodiments of the present disclosure, the processing of order receiving with respect to the article to be mailed according to the mailing service information may include: verifying the reasonableness of the mailing service information according to the mailing address and receiving address in the mailing request; if the verification passes, generating the order receiving processing result and returning the order receiving processing result; if the verification fails, returning the information that the reasonableness verification fails, so that the intelligent mailing cabinet can display the information that the reasonableness verification fails on the display panel and reject the mailing request.

The recommended service information generated by the server is considered from the view of the article and does not take into account the geographical restrictions of transportation. For example, express delivery is forbidden in certain places during certain periods. For another example, next-day delivery is selected in the mailing service information, but the distance between the mailing address and the receiving address is too far to satisfy the next-day delivery. Therefore, after obtaining the mailing service information, the server can verify the reasonableness of the mailing service information according to the mailing address and receiving address in the mailing request. If the verification fails, the server will return the information that the reasonableness verification fails to the intelligent mailing cabinet, and then the display panel of the intelligent mailing cabinet will display the information that the reasonableness verification fails returned by the server, such as "For some reason, your receiving address is currently prohibited from express delivery, so this mailing request has been denied." In addition, there may be other unreasonableness in the mailing service information, so the server needs to verify the reasonableness of the mailing service information. For example, the setting of the insured value needs to be greater than 0. If the insured value is less than 0 due to the user's misoperation, the server can return the information that the reasonableness verification fails to the intelligent mailing cabinet after receiving the mailing service information, and then the display panel of the intelligent mailing cabinet will display the information that the reasonableness verification fails returned by the server, such as "Because the insured value is less than 0, the mailing request is denied". For another example, if there is a payment collection service in the mailing service information, but the site matched based on the address does not support this service, the server can feed back the message to the intelligent mailing cabinet. Certainly, the verification of reasonableness of the mailing service information may also include other verifications, which will not be illustrated one by one here.

If the verification passes, it means that the mailing service information can be realized, then the server can generate the order receiving processing result, and return the generated order receiving processing result to the intelligent mailing cabinet, and then, control the intelligent mailing cabinet to perform the mailing operation according to the order receiving processing result. The mailing operations can include: packaging, affixing sheet, and labeling.

In the reference embodiments of the present disclosure, the order receiving processing result may include: packaging guide operation and mailing sheet information. Therefore, controlling the intelligent mailing cabinet to perform the mailing operation on the articles to be mailed according to the order receiving processing result may include: controlling the printing device of the intelligent mailing cabinet to generate a sheet of the articles to be mailed according to the mailing sheet information; according to the packaging guide operation, controlling the packaging device of the intelligent mailing cabinet to package the article to be mailed and then affixing the sheet onto the article to be mailed. Among them, the mailing sheet information is equivalent to a logistics sheet, and the logistics sheet includes the logistics sheet number, sender information, recipient information, mailing address, receiving address, articles to be mailed, and other information. Through the packaging guide operation, you can determine, when packaging the articles to be mailed, whether to use the packaging box or packaging bag, whether to use packaging fillers, whether to use ice packs, and whether to use moisture-proof agents. For example, if the article to be mailed is a mobile phone, the packaging guide operation obtained is: packaging with a small ordinary packaging box and fillers.

Moreover, in the reference embodiment of the present disclosure, the order receiving processing result may include: label information. Therefore, the mailing operation also includes: controlling the printing device of the intelligent mailing cabinet to generate the label of the article to be mailed according to the label information, and affixing the label to the packaged article to be mailed. For a special article, a label for prompting needs to be affixed to the article. In this case, the order receiving processing result includes the label information that needs to be affixed. For example, if the article to be mailed is a mobile phone, the order receiving processing result includes a fragile label which is required to be affixed to the article packaged according to the packaging guide operation.

The operation processing result may also include: fee information. After the server conducts the order receiving operation, the fee information can be returned to the intelligent mailing cabinet, and then the intelligent mailing cabinet displays the fee information on the display panel and guides the user to pay it. Payment methods can include: paid by sender, paid by recipient, monthly payment, etc. In the embodiments of the present disclosure, when a user uses the intelligent mailing cabinet for mailing, he/she first needs to complete the user's login on the intelligent mailing cabinet, so that the mailing operation is completed with the user's logged-in account, and the fees can be settled directly from the user's logged-in account, which simplifies the user's mailing operation and brings better experience to the user.

Figure 4:
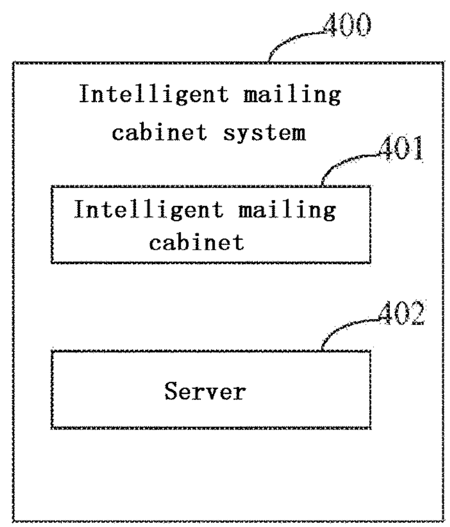
FIG. 4 is a schematic diagram of the structure of an intelligent mailing cabinet system according to an embodiment of the present disclosure.
Figure 5:
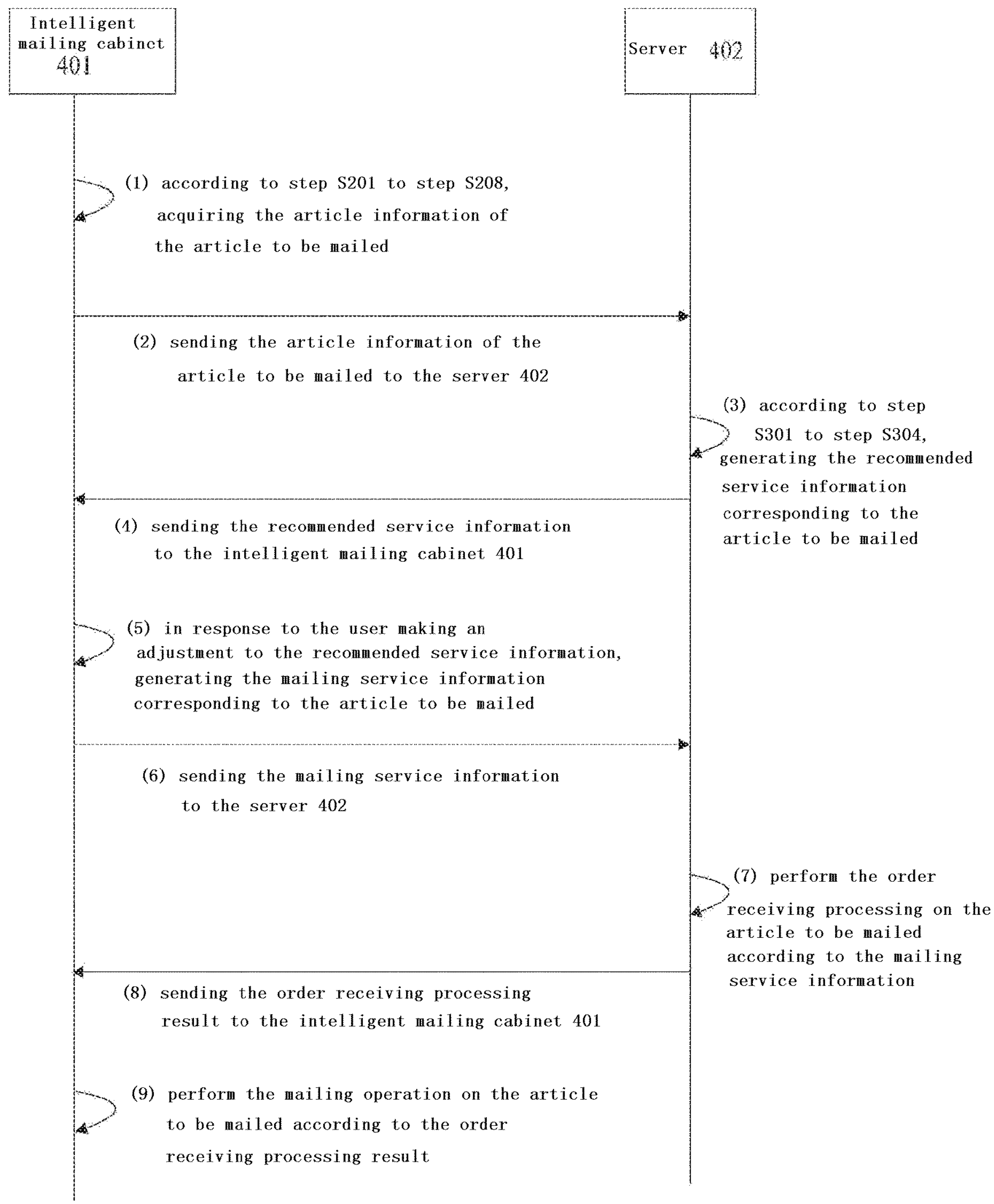
FIG. 5 is a schematic diagram of an interaction process between the intelligent mailing cabinet 401 and a server 402 according to an embodiment of the present disclosure.

FIG. 4 is a schematic diagram of the structure of an intelligent mailing cabinet system according to an embodiment of the present disclosure. As shown in FIG. 4, the intelligent mailing cabinet system 400 may include: an intelligent mailing cabinet 401 and a server 402. FIG. 5 is a schematic diagram of an interaction process between the intelligent mailing cabinet 401 and the server 402 according to an embodiment of the present disclosure. As shown in FIG. 5, the interaction process between the intelligent mailing cabinet 401 and the server 402 is as follows:

(1) The server 402 controls the intelligent mailing cabinet 401 to obtain the article information of the article to be mailed according to the above steps S201 to S208;

(2) The intelligent mailing cabinet 401 sends the article information of the article to be mailed to the server 402;

(3) The server 402 generates the recommended service information corresponding to the article to be mailed according to the article information in accordance with the above steps S301 to S304;

(4) The server 402 sends the recommended service information to the intelligent mailing cabinet 401;

(5) The server 402 controls the intelligent mailing cabinet 401 to generate the mailing service information corresponding to the article to be mailed in response to the user making adjustments to the recommended service information;

(6) The intelligent mailing cabinet 401 sends the mailing service information to the server 402;

(7) The server 402 conducts the order receiving processing with respect to the article to be mailed according to the mailing service information;

(8) The server 402 sends the order receiving processing result to the intelligent mailing cabinet 401;

(9) The server 402 controls the intelligent mailing cabinet 401 to perform the mailing operation on the article to be mailed according to the order receiving processing result.

It should be noted that, in (1), if the intelligent mailing cabinet 401 detects that the article to be mailed contains dangerous liquid, it needs to inform the user of the message through the display panel and rejects the mailing request. In (3), if the server 402 verifies that the article to be mailed does not meet the mailing conditions, it returns the information that does not meet the mailing conditions to the intelligent mailing cabinet 401, so that the display panel can display the information that does not meet the mailing conditions, and rejects the mailing request. In (7), if the server 402 verifies that the reasonableness of the mailing service information fails, it returns the information that the reasonableness verification fails to the intelligent mailing cabinet 401, so that the display panel displays the information that the reasonableness verification fails, and rejects the mailing request.

In the intelligent mailing cabinet system according to the embodiment of the present disclosure, after the user places the articles in the article placement region of the intelligent mailing cabinet, he/she can control the intelligent mailing cabinet to obtain the article information of the article to be mailed without a need of placing an order by filling in the information through the WeChat applet or the official website, which solves the problem of information mismatch between online operation and actual mailing information in the prior art. In addition, the recommended service information generated according to the article information can be sent to the intelligent mailing cabinet, and then the recommended service information can be adjusted in response to the user's needs to obtain the mailing service information, which achieves the effect of performing the mailing operation by using the mailing services corresponding to different articles to be mailed, satisfies more actual application scenarios and brings better user experience.

Figure 6:
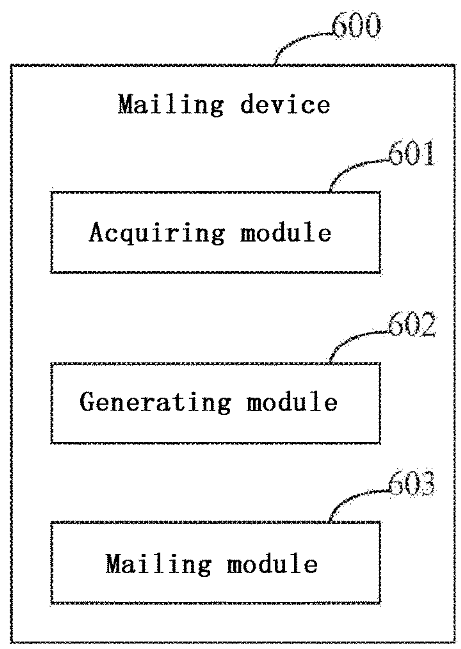
FIG. 6 is a schematic diagram of main modules of a mailing apparatus according to an embodiment of the present disclosure.

FIG. 6 is a schematic diagram of the structure of the main modules of a mailing device according to an embodiment of the present disclosure. As shown in FIG. 6, the main modules of the mailing device 600 may include: an acquiring module 601, a generating module 602 and a mailing module 603.

Therein, the acquiring module 601 can be used to send an opening instruction to the intelligent mailing cabinet in response to the user's mailing request, control the opening of the article placement region of the intelligent mailing cabinet, and acquire the article information of the article to be mailed already placed inside the article placement region; the generating module 602 can be used to generate the recommended service information according to the acquired article information, and send the recommended service information to the intelligent mailing cabinet, so that the intelligent mailing cabinet can display the recommended service information; the mailing module 603 can be used to, in response to the user making adjustments to the recommended service information, determine the mailing service information corresponding to the article to be mailed and control the intelligent mailing cabinet to perform the mailing operation on the article to be mailed according to the mailing service information.

In this embodiment of the present disclosure, the acquiring module 601 may also be used to: after placing the article to be mailed in the article placement region, control the camera of the intelligent mailing cabinet to take a picture of the article to be mailed to obtain a picture of the article to be mailed; invoke the image recognition interface of the intelligent mailing cabinet and identify the article to be mailed to acquire the category information and quantity information of the article to be mailed; weigh the article to be mailed using the weight sensor of the intelligent mailing cabinet and obtain the weight information of the article to be mailed.

In this embodiment of the present disclosure, the acquiring module 601 can also be used to: in the case that the article to be mailed contains liquid, control the intelligent mailing cabinet to eject a liquid detecting device, and use the liquid detecting device to perform safety detection on the liquid; in the case that the liquid is detected to be safe, control the camera to take a picture of the article to be mailed; in the case that the liquid is detected to be dangerous, send information to the intelligent mailing cabinet that the liquid is dangerous, and reject the mailing request.

In this embodiment of the present disclosure, the acquiring module 601 is further used to: send the article information to the intelligent mailing cabinet, and control the intelligent mailing cabinet to display the article information, so that the user can confirm the article information.

In this embodiment of the present disclosure, the generating module 602 is also used to: determine whether the article to be mailed meets the condition for mailing according to the article information; if yes, using the article information as a matching condition, match the first recommended service information corresponding to the article to be mailed from the article knowledge base, and predict the second recommended service information corresponding to the article information based on the user behavior analysis model; if no, return the information that does not meet the condition for mailing to the intelligent mailing cabinet, so that the intelligent mailing cabinet can display the information that does not meet the condition for mailing and reject the mailing request; wherein, the recommended service information consists of the first recommended service information and the second recommended service information.

In this embodiment of the present disclosure, the mailing module 603 is further used to: after the user making adjustments to the displayed recommended service information according to specific requirements, determine that the displayed service information is the mailing service information.

In this embodiment of the present disclosure, the mailing module 603 is further used to: perform order receiving processing on the article to be mailed according to the mailing service information, and send the order receiving processing result to the intelligent mailing cabinet, so as to control the intelligent mailing cabinet to perform a mailing operation on the article to be mailed according to the order receiving processing result.

In this embodiment of the present disclosure, the order receiving processing result includes: packaging guide operation and mailing sheet information; and the mailing module 603 is further configured to: control the printing device of the intelligent mailing cabinet to generate a sheet of the article to be mailed according to the mailing sheet information; according to the packaging guide operation, control the packaging device of the intelligent mailing cabinet to package the article to be mailed, and then affix the sheet to the packaged article to be mailed.

In this embodiment of the present disclosure, the order receiving processing result includes: label information; and the mailing module 603 is further configured to: control the printing device to generate a label of the article to be mailed according to the label information, and affix the label to the packaged article to be mailed.

In this embodiment of the present disclosure, the order receiving processing result includes: fee information; and the mailing module 603 is further used to: control the intelligent mailing cabinet to display the fee information, so as to guide the user to pay the fee.

In this embodiment of the present disclosure, the mailing request includes: a mailing address and a receiving address; and the mailing module 603 is further configured to: verify the reasonableness of the mailing service information according to the mailing address and receiving address; if the verification passes, the order receiving processing result is generated and returned; if the verification fails, the information that the reasonableness verification fails is returned, so that the intelligent mailing cabinet can display the information that the reasonableness verification fails and reject the mailing request.

It can be seen from the above description that after the user places the article in the article placement region of the intelligent mailing cabinet, he/she can control the intelligent mailing cabinet to obtain the article information of the article to be mailed without a need of placing an order by filling in the information through the WeChat applet or the official website, which solves the problem of information mismatch between online operation and actual delivery in the prior art. In addition, the recommended service information generated according to the article information can be sent to the intelligent mailing cabinet, and then the recommended service information can be adjusted in response to the user's demand to obtain the mailing service information, which achieves the effect of performing the mailing operation by using the mailing services corresponding to different articles to be mailed, satisfies more actual application scenarios and brings better user experience.

Figure 7:
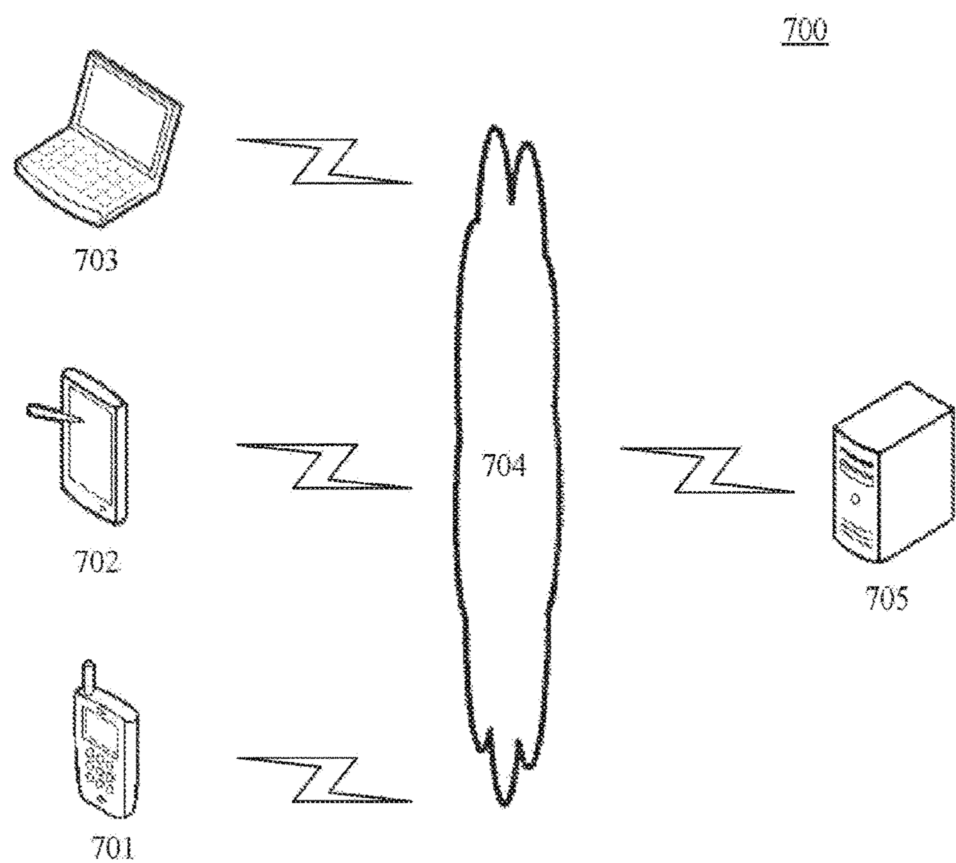
FIG. 7 is an exemplary system architecture diagram to which embodiments of the present disclosure may be applied.

FIG. 7 shows an exemplary system architecture 700 to which the mailing method or mailing apparatus in the embodiments of the present disclosure may be applied;

As shown in FIG. 7, the system architecture 700 may include terminal devices 701, 702, and 703, a network 704 and a server 705. The network 704 is used to provide a medium of a communication link between the terminal devices 701, 702, 703 and a controller 705 of the intelligent mailing cabinet. The network 704 may include various connection types, such as wired, wireless communication links, or fiber-optic cables, etc.

The user can use the terminal devices 701, 702, 703 to interact with the server 705 through the network 704 to receive or send messages. Various applications may be installed on the terminal devices 701, 702, and 703, for example, applications that provide mailing services.

The terminal devices 701, 702, 703 may be various electronic devices having a display screen and supporting web browsing, including but not limited to intelligent mailing cabinet, smart phone, tablet computer, laptop and desktop computer, and the like.

The server 705 may be a server that provides various services, such as a background management server (only an example) that provides support for the mailing service provided using the terminal devices 701, 702, and 703. The background management server can analyze and process the received mailing request, and feed back the processing result to the terminal devices.

It should be noted that the mailing method provided by the embodiments of the present disclosure is generally executed by the server 705, and accordingly, the mailing device is generally arranged in the server 705.

It should be understood that the numbers of terminal devices, networks and servers in FIG. 7 are only illustrative. There can be any number of terminal devices, networks and servers according to needs for implementation.

Figure 8:
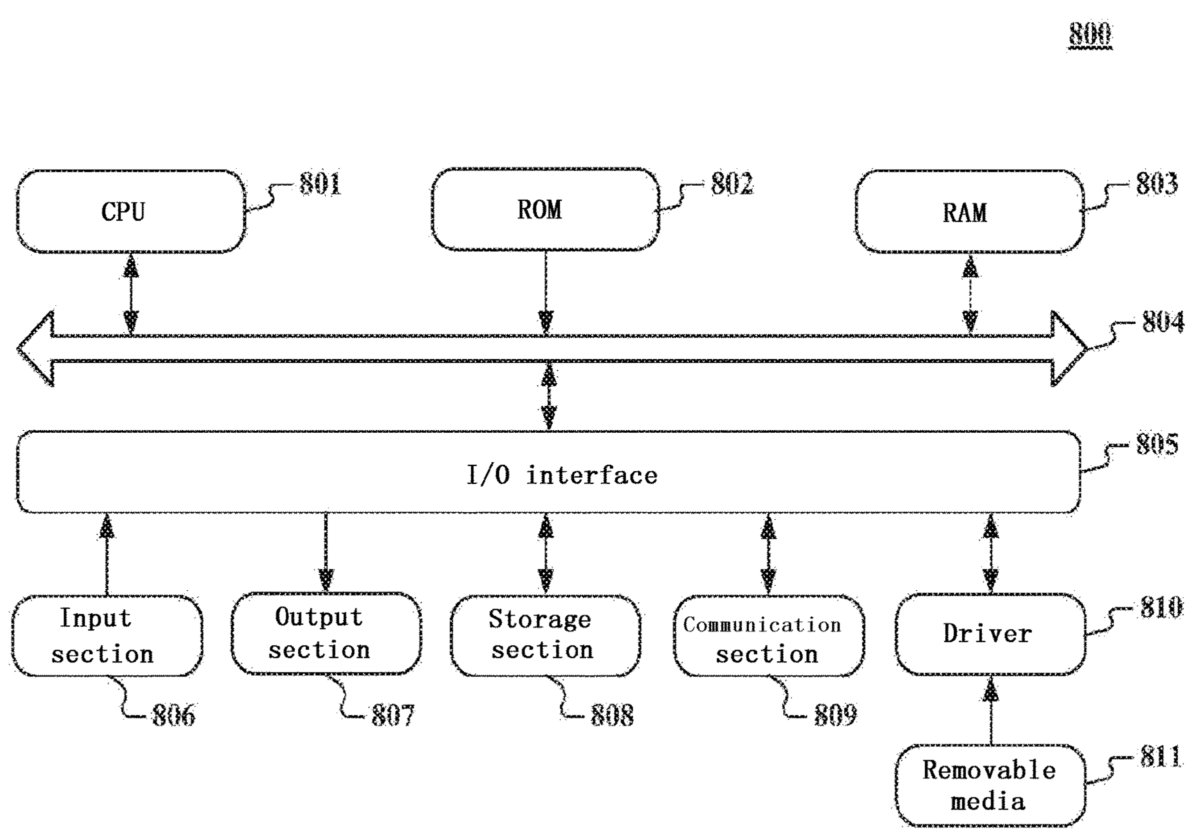
FIG. 8 is a schematic diagram of the structure of a computer system adapted to implementing a terminal device or a server according to an embodiment of the present disclosure.

Referring next to FIG. 8, it shows a schematic diagram of the structure of a computer system 800 adapted to implementing a terminal device of an embodiment of the present disclosure. The terminal device shown in FIG. 8 is only an example and should not impose any limitations on the function and scope of use of the embodiments of the present disclosure.

As shown in FIG. 8, a computer system 800 includes a central processing unit (CPU) 801 which can execute various proper actions and processes according to a program stored in a read only memory (ROM) 802 or a program loaded into a random access memory (RAM) 803 from the storage section 808. In the RAM 803, various programs and data necessary for the operation of the system 800 are also stored. The CPU 801, the ROM 802, and the RAM 803 are connected to each other through a bus 804. An input/output (I/O) interface 805 is also connected to bus 804.

The following components are connected to the I/O interface 805: an input section 806 including a keyboard, a mouse, etc.; an output section 807 including a cathode ray tube (CRT), a liquid crystal display (LCD), and a speaker, etc.; a storage section 808 including a hard disk, etc.; and a communication section 809 including a network interface card such as a LAN card and a modem. The communication section 809 performs communication processing via a network such as the Internet. A drive 810 is also connected to the I/O interface 805 as needed. Removable mediums 811, such as a magnetic disk, an optical disk, a magneto-optical disk, a semiconductor memory, are mounted on the drive 810 as needed so that a computer program read therefrom is installed into the storage section 808 as needed.

In particular, according to embodiments of the present disclosure, the processes described above with reference to the flowchart may be implemented as computer software programs. For example, the embodiments of the present disclosure include a computer program product comprising a computer program carried on a computer-readable medium, the computer program containing a program code for executing the method illustrated in the flowchart. In such an embodiment, the computer program may be downloaded from the network and installed via the communication section 809, and/or installed from the removable medium 811. When the computer program is executed by the central processing unit (CPU) 801, the above-described functions defined in the system of the present disclosure are executed.

It should be noted that the computer-readable medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of the computer readable storage media may include, but not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In this disclosure, the computer-readable storage medium may be any tangible medium that contains or stores a program that can be used by or in conjunction with an instruction execution system, apparatus, or device. In the present disclosure, however, a computer-readable signal medium may include a data signal propagated in baseband or as a part of a carrier wave, carrying a computer-readable program code therein. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. The program code contained in the computer readable medium may be transmitted using any suitable medium including, but not limited to, wireless, wired, optical fiber cable, RF, etc., or any suitable combination of the foregoing.

The flowchart and block diagrams in the figures illustrate the architecture, functionality, and operation that can be possibly implemented according to systems, methods and computer program products of various embodiments of the present disclosure. In this regard, each block in the flowchart or block diagrams may represent a module, program segment, or a portion of code that contains one or more executable instructions for implementing the specified logical functions. It should also be noted that, in some alternative implementations, the functions marked in the blocks may occur in an order different from that marked in the figures. For example, two blocks shown in succession may, in fact, be executed substantially concurrently, or the blocks may sometimes be executed in a reverse order, depending upon the functionality involved. It is also noted that each block of the block diagrams or flowchart diagram, and combinations of blocks in the block diagrams or flowchart diagram, can be implemented in dedicated hardware-based systems that perform the specified functions or operations, or can be implemented using a combination of dedicated hardware and computer instructions.

The modules involved in the embodiments of the present disclosure may be implemented in software or hardware. The described modules can also be set in the processor, for example, it can be described as: a processor includes an acquiring module, a generating module and a mailing module. Wherein, the names of these modules do not constitute a limitation to the module itself under certain circumstances. For example, the acquiring module can also be described as "the module configured to, in response to the user's mailing request, send an opening instruction to the intelligent mailing cabinet, control the article placement region of the intelligent mailing cabinet to open, and acquire the article information of the article to be mailed already placed inside the article placement region".

As another aspect, the present disclosure also provides a computer-readable medium. The computer-readable medium may be included in the device described in the above-mentioned embodiments, or it may exist alone without being assembled into the device. The above-mentioned computer-readable medium carries one or more programs, and when the above-mentioned one or more programs are executed by one of the device, the device includes: in response to the user's mailing request, sending an opening instruction to the intelligent mailing cabinet, controlling the article placement region of the intelligent mailing cabinet to open, and acquiring the article information of the articles to be mailed already placed inside the article placement region; according to the acquired article information, generating the recommended service information, and sending the recommended service information to the intelligent mailing cabinet, so that the intelligent mailing cabinet can display the recommended service information; in response to the user making adjustments to the recommended service information, determining the mailing service information corresponding to the article to be mailed, and controlling the intelligent mailing cabinet to perform the mailing operation on the article to be mailed according to the mailing service information.

According to the technical solutions of the embodiments of the present disclosure, after the user places the article in the article placement region of the intelligent mailing cabinet, he/she can control the intelligent mailing cabinet to obtain the article information of the article to be mailed without a need of placing an order by filling in the information through the WeChat applet or the official website, which solves the problem of information mismatch between online operation and actual delivery in the prior art. In addition, the recommended service information generated according to the article information can be sent to the intelligent mailing cabinet, and then the recommended service information can be adjusted in response to the user's needs to obtain the mailing service information, which achieves the effect of performing the mailing operation by using the mailing services corresponding to different articles to be mailed, satisfies more actual application scenarios and brings better user experience.

The above-mentioned specific embodiments do not constitute a limitation to the scope of protection of the present disclosure. It should be understood by those skilled in the art that various modifications, combinations, sub-combinations and substitutions may occur depending on design requirements and other factors. Any modifications, equivalent replacements, and improvements made within the spirit and principles of the present disclosure should be included within the scope of protection of the present disclosure.

The invention claimed is:

1. A mailing method performed via a processor executing a computer program, comprising:

in response to a mailing request from a user, sending, with the processor, an opening instruction to an intelligent mailing cabinet, controlling an article placement region of the intelligent mailing cabinet to open, and acquiring article information of an article to be mailed already placed inside the article placement region;

generating, with the processor, recommended service information according to the acquired article information, and sending the recommended service information to the intelligent mailing cabinet, such that the intelligent mailing cabinet displays the recommended service information; and in response to the user making an adjustment to the recommended service information, determining, with the processor, mailing service information corresponding to the article to be mailed, and controlling the intelligent mailing cabinet to perform a mailing operation with respect to the article according to the mailing service information, wherein, before controlling the camera of the intelligent mailing cabinet to take a picture of the article to be mailed, the method further comprises:

in the case that the article to be mailed contains liquid, determine whether the liquid is safe;

in the case of determining that the liquid is safe, controlling, with the processor, the camera to take a picture of the article to be mailed;

in the case of determining that the liquid is dangerous, sending, with the processor, information that the liquid is dangerous to the intelligent mailing cabinet, and rejecting the mailing request.

2. The method according to claim 1, wherein the controlling of the intelligent mailing cabinet to perform a mailing operation on the article to be mailed according to the mailing service information comprises:

conducting order receiving processing to the article to be mailed according to the mailing service information, and sending the order receiving processing result to the intelligent mailing cabinet, so as to control the intelligent mailing cabinet to perform the mailing operation on the article to be mailed according to the order receiving processing result.

3. The method according to claim 2, wherein, the order receiving processing result comprises: packaging guide operation and mailing sheet information; and, the controlling of the intelligent mailing cabinet to perform the mailing operation on the articles to be mailed according to the order receiving processing result, includes:

controlling a printing device of the intelligent mailing cabinet to generate a sheet of the article to be mailed according to the mailing sheet information;

according to the packaging guide operation, controlling the packaging device of the intelligent mailing cabinet to package the articles to be mailed, and then affixing the sheet to the packaged articles to be mailed.

4. The method according to claim 3, wherein the order receiving processing result comprises: label information; and the method further comprising:

according to the label information, controlling, with the processor, the printing device to generate the label of the article to be mailed, and affixing the label to the packaged article to be mailed.

5. The method according to claim 2, wherein the operation processing result comprises: fee information; and the method further comprising:

controlling, with the processor, the intelligent mailing cabinet to display the fee information so as to guide the user to pay the fee.

6. The method according to claim 2, wherein the mailing request comprises: mailing address and receiving address; and conducting the order receiving processing to the article to be mailed according to the mailing service information, comprises:

verifying the reasonableness of the mailing service information according to the mailing address and receiving address;

if the verification passes, generating the order receiving processing result and returning the order receiving processing result;

if the verification fails, returning information that the reasonableness verification fails so that the intelligent mailing cabinet can display the information that the reasonableness verification fails and reject the mailing request.

7. The method according to claim 1, wherein the acquiring of the article to be mailed already placed inside the article placement region includes:

after the article to be mailed is placed inside the article placement region, controlling a camera of the intelligent mailing cabinet to take a picture of the article to be mailed to obtain the picture of the article to be mailed;

invoking an image recognition interface of the intelligent mailing cabinet to identify the image of the article to be mailed to obtain category information and quantity information of the article to be mailed;

weighing the article to be mailed using a weight sensor of the intelligent mailing cabinet and obtaining weight information of the article to be mailed.

8. The method according to claim 1, wherein, after acquiring the article information of the article to be mailed already placed inside the article placement region, the method further comprises:

sending, with the processor, the article information to the intelligent mailing cabinet and controlling the intelligent mailing cabinet to display the article information so that the user can confirm the article information.

9. The method according to claim 1, wherein the article knowledge base is generated by mapping articles based on set mailing rules, and the article knowledge base stores a mapping relationship between articles and mailing conditions corresponding to the articles.

10. The method according to claim 1, wherein, in response to the user making adjustments to the recommended service information, the determining of the mailing service information corresponding to the article to be mailed comprises:

after the user adjusts the displayed recommended service information according to specific requirements, determining that the displayed service information is the mailing service information.

11. The method according to claim 1, wherein the generating of the recommended service information according to the acquired article information comprises:

according to the acquired article information, determining whether the article to be mailed meets mailing conditions;

if the article to be mailed meets the mailing conditions, taking the acquired article information as a matching condition, matching first recommended service information corresponding to the article to be mailed from an article knowledge base, and predicting second recommended service information corresponding to the acquired article information based on a user behavior analysis model, the user behavior analysis model is a model obtained by analyzing the user's historical mailing behavior;

if the article to be mailed does not meet the mailing conditions, returning information that does not meet the mailing conditions to the intelligent mailing cabinet, so that the intelligent mailing cabinet can display the information that does not meet the mailing conditions and reject the mailing request;

wherein the recommended service information consists of the first recommended service information and the second recommended service information.

12. A non-transitory computer-readable medium with a computer program stored thereon, when executed by a processor, the program implements a method comprising:

in response to a mailing request from a user, sending an opening instruction to an intelligent mailing cabinet, controlling an article placement region of the intelligent mailing cabinet to open, and acquiring article information of an article to be mailed already placed inside the article placement region;

generating recommended service information according to the acquired article information, and sending the recommended service information to the intelligent mailing cabinet, such that the intelligent mailing cabinet displays the recommended service information; and in response to the user making an adjustment to the recommended service information, determining mailing service information corresponding to the article to be mailed, and controlling the intelligent mailing cabinet to perform a mailing operation with respect to the article according to the mailing service information, wherein, before controlling the camera of the intelligent mailing cabinet to take a picture of the article to be mailed, the method further comprises:

in the case that the article to be mailed contains liquid, determine whether the liquid is safe;

in the case of determining that the liquid is safe, controlling the camera to take a picture of the article to be mailed;

in the case of determining that the liquid is dangerous, sending information that the liquid is dangerous to the intelligent mailing cabinet, and rejecting the mailing request.

13. The non-transitory computer-readable medium according to claim 12, wherein the acquiring of the article to be mailed already placed inside the article placement region includes:

after the article to be mailed is placed inside the article placement region, controlling a camera of the intelligent mailing cabinet to take a picture of the article to be mailed to obtain the picture of the article to be mailed;

invoking an image recognition interface of the intelligent mailing cabinet to identify the image of the article to be mailed to obtain category information and quantity information of the article to be mailed;

weighing the article to be mailed using a weight sensor of the intelligent mailing cabinet and obtaining weight information of the article to be mailed.

14. The non-transitory computer-readable medium according to claim 12, wherein, after acquiring the article information of the article to be mailed already placed inside the article placement region, the method further comprises:

sending the article information to the intelligent mailing cabinet and controlling the intelligent mailing cabinet to display the article information so that the user can confirm the article information.

15. The non-transitory computer-readable medium according to claim 12, wherein the article knowledge base is generated by mapping articles based on set mailing rules, and the article knowledge base stores a mapping relationship between articles and mailing conditions corresponding to the articles.

16. The non-transitory computer-readable medium according to claim 12, wherein, in response to the user making adjustments to the recommended service information, the determining of the mailing service information corresponding to the article to be mailed comprises:

after the user adjusts the displayed recommended service information according to specific requirements, determining that the displayed service information is the mailing service information.

17. The non-transitory computer-readable medium according to claim 12, wherein the controlling of the intelligent mailing cabinet to perform a mailing operation on the article to be mailed according to the mailing service information comprises:

conducting order receiving processing to the article to be mailed according to the mailing service information, and sending the order receiving processing result to the intelligent mailing cabinet, so as to control the intelligent mailing cabinet to perform the mailing operation on the article to be mailed according to the order receiving processing result.

18. The non-transitory computer-readable medium according to claim 12, wherein, the generating of the recommended service information according to the acquired article information comprises:

according to the acquired article information, determining whether the article to be mailed meets mailing conditions;

if the article to be mailed meets the mailing conditions, taking the acquired article information as a matching condition, matching first recommended service information corresponding to the article to be mailed from an article knowledge base, and predicting second recommended service information corresponding to the acquired article information based on a user behavior analysis model, the user behavior analysis model is a model obtained by analyzing the user's historical mailing behavior;

if the article to be mailed does not meet the mailing conditions, returning information that does not meet the mailing conditions to the intelligent mailing cabinet, so that the intelligent mailing cabinet can display the information that does not meet the mailing conditions and reject the mailing request;

wherein the recommended service information consists of the first recommended service information and the second recommended service information.

* * * * *

UNITED STATES PATENT AND TRADEMARK OFFICE

CERTIFICATE OF CORRECTION

PATENT NO. : 12,346,868 B2
APPLICATION NO. : 18/024634
DATED : July 1, 2025
INVENTOR(S) : Jianmin Yang et al.

It is certified that error appears in the above-identified patent and that said Letters Patent is hereby corrected as shown below:

On the Title Page

Item (73) Assignee:
Please change the name of the Assignee from "BEIJING JINDONG ZHENSHI INFORMATION TECHNOLOGY CO., LTD.." to -- BEIJING JINGDONG ZHENSHI INFORMATION TECHNOLOGY CO., LTD. --

Signed and Sealed this
Eighteenth Day of November, 2025

John A. Squires
*Director of the United States Patent and Trademark Office*